United States Patent
Yoon et al.

(10) Patent No.: US 8,723,782 B2
(45) Date of Patent: May 13, 2014

(54) LIGHT EMITTING LAMP, BACKLIGHT ASSEMBLY AND DISPLAY DEVICE HAVING THE SAME

(75) Inventors: Sang-Hyuck Yoon, Seoul (KR); Hee-Tae Kim, Yongin-si (KR); Tae-Il Lee, Seoul (KR); So-Jin Ryu, Seoul (KR)

(73) Assignee: Samsung Display Co., Ltd. (KR)

( * ) Notice: Subject to any disclaimer, the term of this patent is extended or adjusted under 35 U.S.C. 154(b) by 976 days.

(21) Appl. No.: 12/692,666

(22) Filed: Jan. 25, 2010

(65) Prior Publication Data

US 2010/0201718 A1 Aug. 12, 2010

(30) Foreign Application Priority Data

Feb. 10, 2009 (KR) ........................ 10-2009-0010652

(51) Int. Cl.
*G09G 3/36* (2006.01)

(52) U.S. Cl.
USPC ............ 345/102; 362/225; 313/607; 313/234

(58) Field of Classification Search
USPC .................................. 345/102; 313/234, 607
See application file for complete search history.

(56) References Cited

U.S. PATENT DOCUMENTS

| | | | | |
|---|---|---|---|---|
| 5,514,934 A | * | 5/1996 | Matsumoto et al. | 313/607 |
| 6,583,555 B2 | * | 6/2003 | Matsukawa et al. | 313/495 |
| 6,933,918 B1 | * | 8/2005 | Park et al. | 345/102 |
| 6,956,556 B2 | * | 10/2005 | Yajima et al. | 345/102 |
| 7,586,045 B2 | * | 9/2009 | Kim et al. | 174/126.4 |
| 2004/0004441 A1 | * | 1/2004 | Yano | 315/169.1 |
| 2006/0181214 A1 | * | 8/2006 | Moon | 313/607 |

FOREIGN PATENT DOCUMENTS

| | | |
|---|---|---|
| JP | 2005-134919 A | 5/2005 |
| KR | 10-2005-0104695 A | 11/2005 |
| KR | 10-2006-0043121 A | 5/2006 |

\* cited by examiner

*Primary Examiner* — Sumati Lefkowitz
*Assistant Examiner* — Joseph Fox
(74) *Attorney, Agent, or Firm* — Cantor Colburn LLP

(57) ABSTRACT

A light emitting lamp, a backlight assembly and a display device including the same are provided. The light emitting lamp includes a lamp tube longitudinally extended along an extension line, and a plurality of set electrodes disposed on a periphery of the lamp tube and along the extension line. The periphery of the lamp tube is divided into a first region and a second region by a plane including the extension line, and each of the set electrodes includes a first electrode disposed on the first region and a second electrode disposed on the second region.

25 Claims, 12 Drawing Sheets

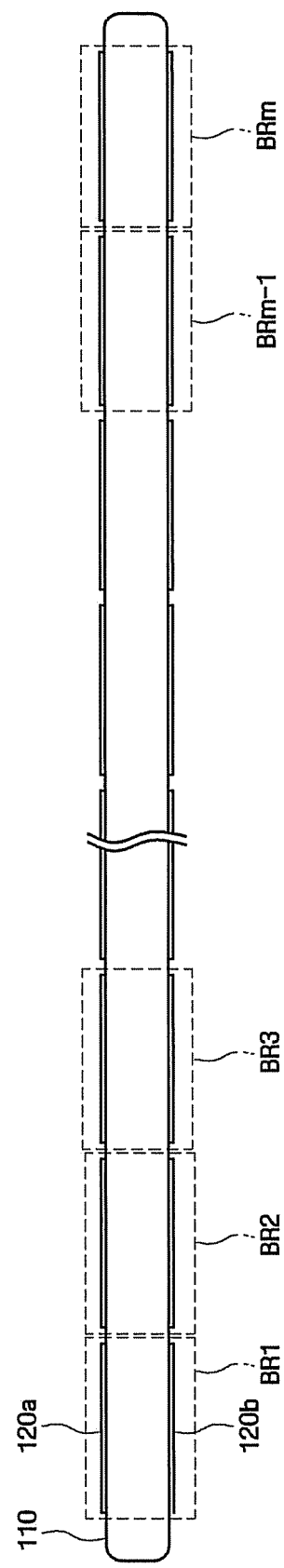

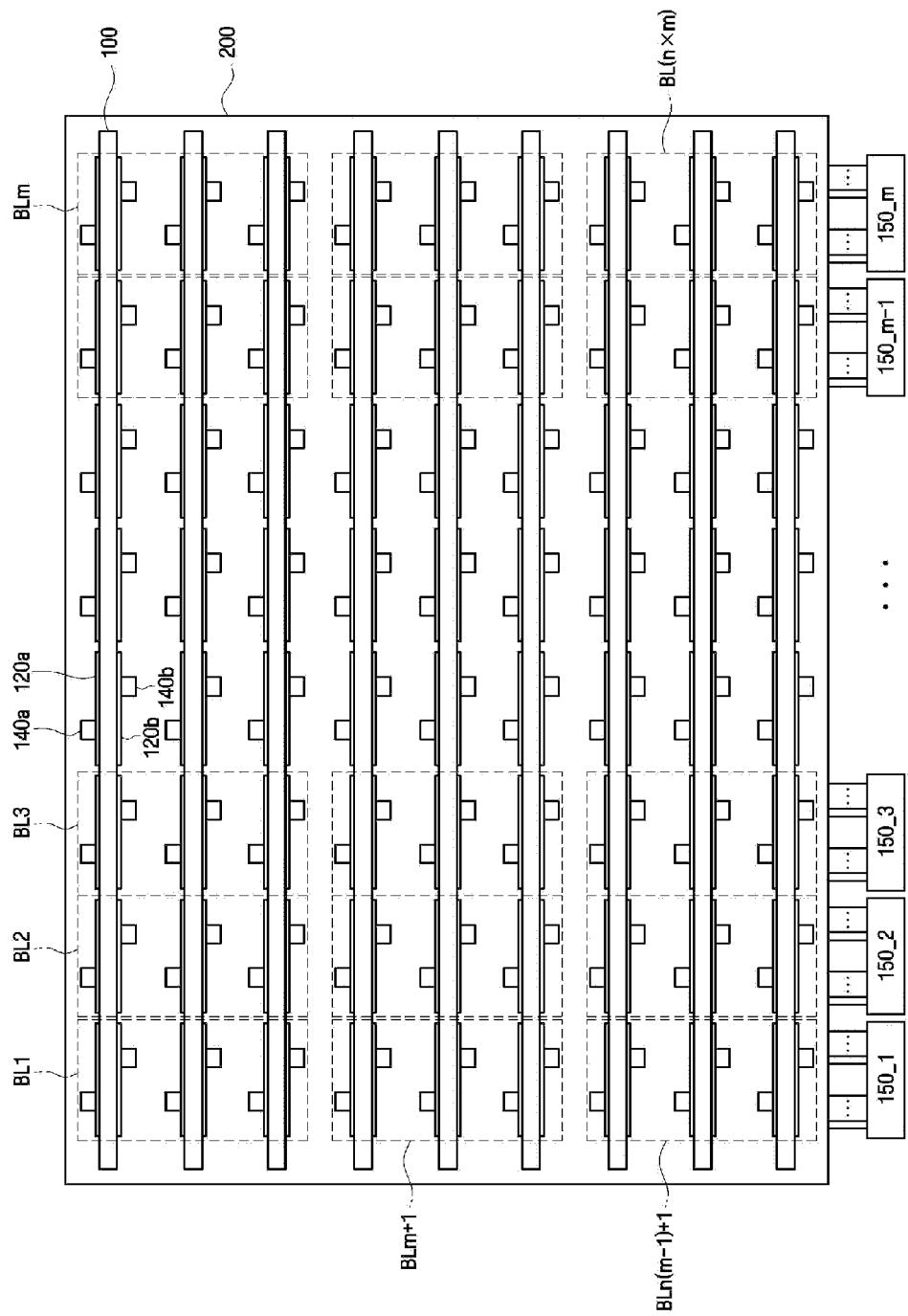

LIGHT EMITTING LAMP, BACKLIGHT ASSEMBLY AND DISPLAY DEVICE HAVING THE SAME

This application claims priority to Korean Patent Application No. 10-2009-0010652, filed on Feb. 10, 2009, and all the benefits accruing therefrom under 35 U.S.C. §119, the disclosure of which is incorporated herein in its entirety by reference.

BACKGROUND OF THE INVENTION

1. Field of the Invention

The present invention relates to a light emitting lamp, a backlight assembly and a display device including the same, and more particularly to a light emitting lamp having an improved display quality, a backlight assembly and a display device including the same.

2. Description of the Related Art

A liquid crystal display ("LCD"), which is one of the most widely used types of flat panel displays ("FPDs"), includes two substrates, on which electrodes are formed, and a liquid crystal layer interposed between the two substrates. In such a liquid crystal display, liquid crystal molecules of the liquid crystal layer are rearranged in accordance with voltages being applied to the electrodes, and thus the quantity of light passing through the liquid crystal layer is adjusted.

Although a liquid crystal display has been widely used due to its low power consumption and so on, the liquid crystal display has no self-luminous capability, and thus separate light sources for irradiating light are required. As such light sources, light emitting lamps, e.g. fluorescent lamps, have been usefully used. Examples of light emitting lamps include cold cathode fluorescent lamps ("CCFL"), hot cathode fluorescent lamps ("HCFL"), and external electrode fluorescent lamps ("EEFL"), which are line light sources.

However, where such line light sources are used in implementing a local dimming for controlling luminance through division of a display panel into a plurality of light emitting blocks, only one-dimensional local dimming in a row or column direction can be implemented.

BRIEF SUMMARY OF THE INVENTION

Accordingly, the present invention has been made to solve the above-mentioned problems occurring in the prior art, and exemplary embodiments of the present invention provide a light emitting lamp having an improved display quality.

An exemplary embodiment of the present invention provides a backlight assembly having an improved display quality.

Another exemplary embodiment of the present invention provides a display device having an improved display quality.

In an exemplary embodiment, there is provided a light emitting lamp which includes a lamp tube longitudinally extended along an extension line, and a plurality of set electrodes disposed on a periphery of the lamp tube. The periphery of the lamp tube is divided into a first region and a second region by a plane including the extension line, and each of the set electrodes includes a first electrode disposed on the first region and a second electrode disposed on the second region.

In an exemplary embodiment, there is provided a backlight assembly, which includes a plurality of light emitting lamps and a backlight driver controlling luminance of light being provided by the light emitting lamps. Each light emitting lamp includes a lamp tube longitudinally extended along an extension line, and a plurality of set electrodes disposed on a periphery of the lamp tube. The periphery of the lamp tube is divided into a first region and a second region by a plane including the extension line, and each of the set electrodes includes a first electrode disposed on the first region and a second electrode disposed on the second region.

In an exemplary embodiment, there is provided a display device, which includes a liquid crystal panel displaying images, a plurality of light emitting lamps providing light to the liquid crystal panel and a backlight driver controlling luminance of light being provided by the light emitting lamps. Each light emitting lamp includes a lamp tube longitudinally extended along an extension line, and a plurality of set electrodes disposed on a periphery of the lamp tube. The periphery of the lamp tube is divided into a first region and a second region by a plane including the extension line, and each of the set electrodes includes a first electrode disposed on the first region and a second electrode disposed on the second region.

BRIEF DESCRIPTION OF THE DRAWINGS

The above and other features and advantages of the present invention will be more apparent from the following detailed description taken in conjunction with the accompanying drawings, in which:

FIG. 2C is a plan view of the light emitting lamp of FIG. 1A;

FIG. 5 is a conceptual view illustrating a backlight assembly according to an exemplary embodiment of the present invention;

DETAILED DESCRIPTION OF THE INVENTION

Figure 1A:
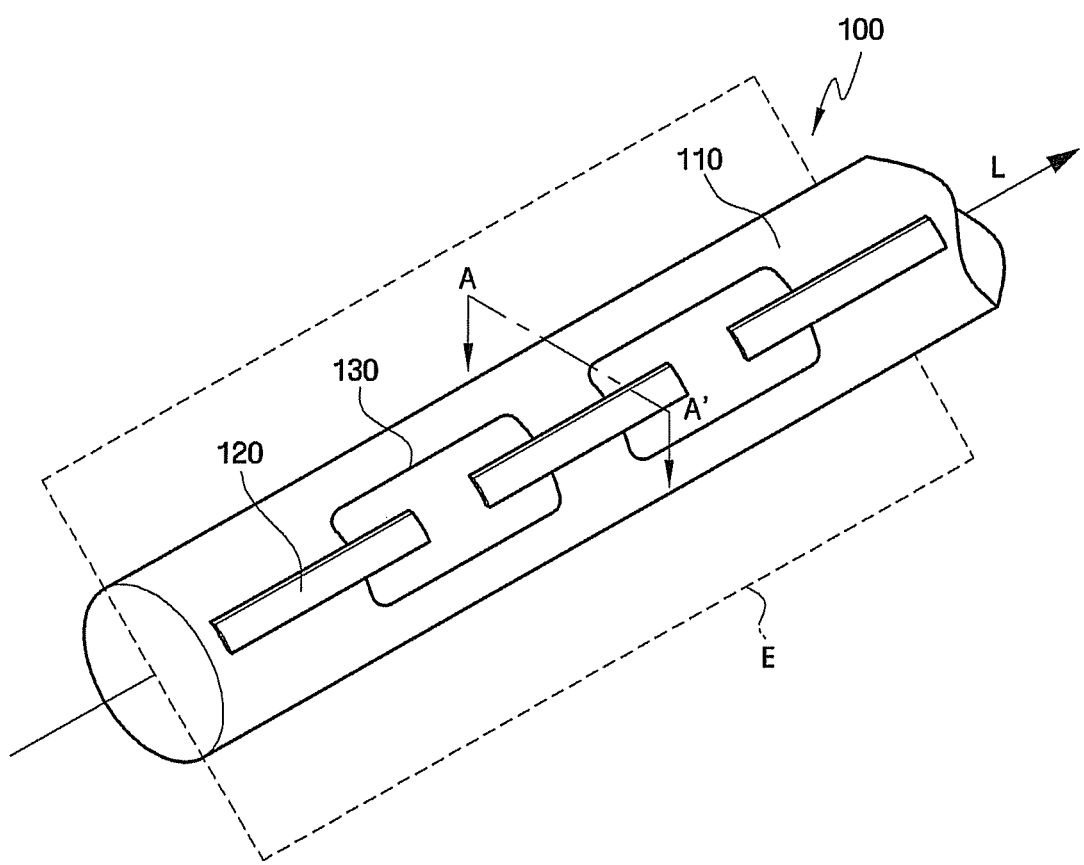
FIG. 1A is a partial perspective view illustrating a light emitting lamp according to an exemplary embodiment of the present invention.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The term "on," "connected to" or "coupled to" which is used to designate a disposing, connection or coupling of one element to another element includes both a case that an element is "directly on, connected or coupled to" another element and a case that an element is on, connected or coupled to another element via still another element. In this case, the term "directly on," "directly connected to" or "directly coupled to" means that an element is on, connected or coupled to another element without intervention of any other element. In the entire description of the present invention, the same drawing reference numerals are used for the same elements across various figures. Also, the term "and/or" includes the respective described items and combinations thereof.

Although the terms "first, second, and so forth" are used to describe diverse elements, components and/or sections, such elements, components and/or sections are not limited by the terms. The terms are used only to discriminate an element, component, or section from other elements, components, or sections. Accordingly, in the following description, a first element, first component, or first section may be a second element, second component, or second section.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

In the following description of the present invention, the terms used are for explaining embodiments of the present invention, but do not limit the scope of the present invention. In the description, a singular expression may include a plural expression unless specially described. The term "comprises" and/or "comprising" used in the description means that one or more other components, steps, operation and/or existence or addition of elements are not excluded in addition to the described components, steps, operation and/or elements.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless specially defined, all terms (including technical and scientific terms) used in the description could be used as meanings commonly understood by those ordinary skilled in the art to which the present invention belongs. In addition, terms that are generally used but are not defined in the dictionary are not interpreted ideally or excessively unless they have been clearly and specially defined.

Hereinafter, with reference to FIGS. 1A to 2C, a light emitting lamp according to an exemplary embodiment of the present invention will be described in detail.

Figure 1B:
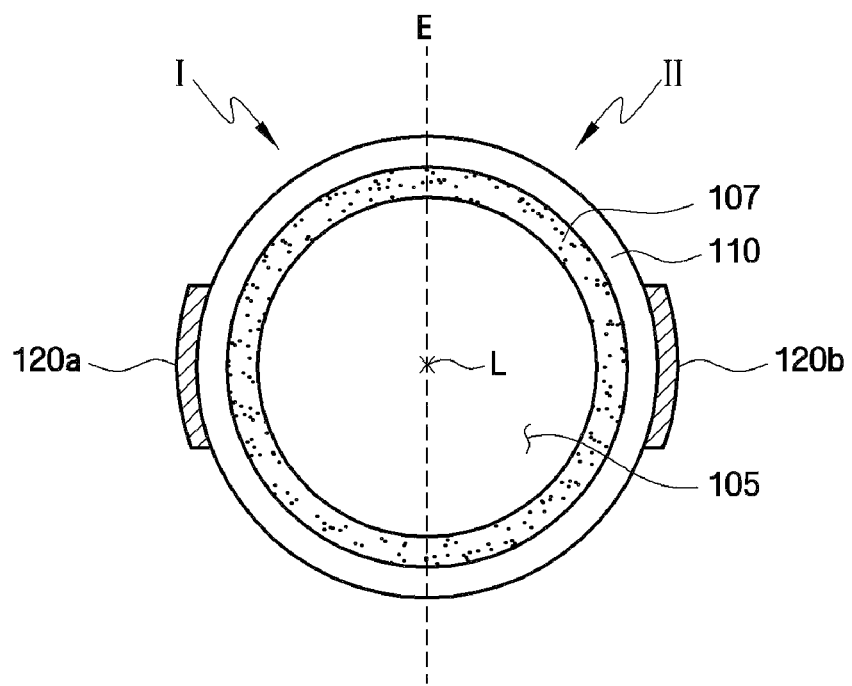
FIG. 1B is a sectional view of the light emitting lamp, taken along line A-A' of FIG. 1A.
Figure 2A:
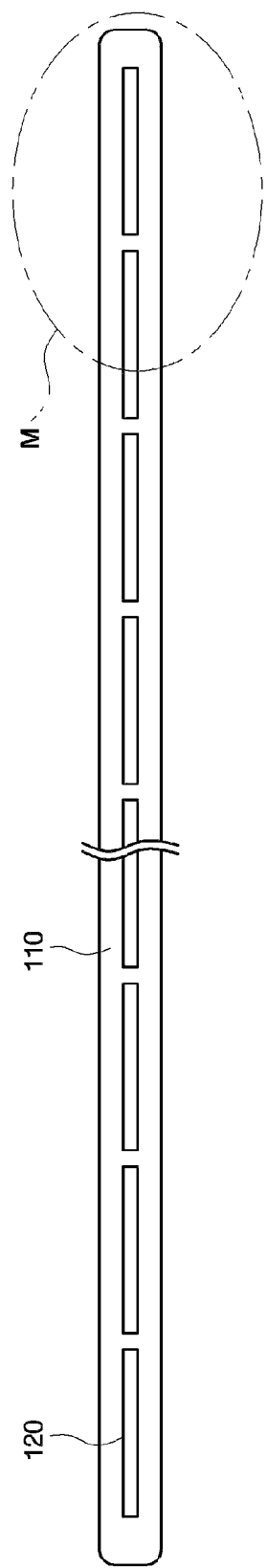
FIG. 2A is a side view of the light emitting lamp of FIG. 1A.
Figure 2B:
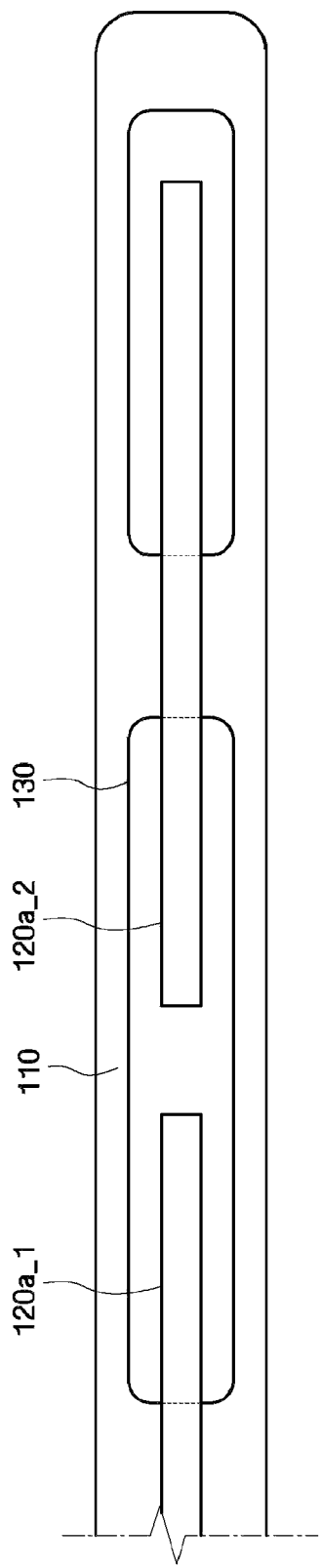
FIG. 2B is a partial enlarged view of portion "M" in FIG. 2A.

FIG. 1A is a partial perspective view illustrating a light emitting lamp according to an exemplary embodiment of the present invention, and FIG. 1B is a sectional view of the light emitting lamp, taken along line A-A' of FIG. 1A. FIG. 2A is a side view seen from the side of the light emitting lamp of FIG. 1A, FIG. 2B is a partial enlarged view of portion "M" in FIG. 2A, and FIG. 2C is a plan view seen from the upper part of the light emitting lamp of FIG. 1A.

Referring to FIGS. 1A to 2C, a light emitting lamp 100 according to an exemplary embodiment of the present invention includes a lamp tube 110 longitudinally extended in a first direction, such as along an extension line L defined within the lamp tube 110, and a plurality of set electrodes 120 disposed on a periphery of the lamp tube 110. Each set electrode 120 may include a plurality of an electrode disposed on an outer surface (e.g., periphery) of the lamp tube 110.

The lamp tube 110 is longitudinally extended along the extension line L, and may be in the form of a hollow pipe. In the illustrated embodiment, the extension line L is substantially a straight line in a length direction of the lamp tube 110, and may mean a virtual straight line penetrating a center of the lamp tube 110. The extension line L, for example, may mean a center axis of the lamp tube 110. In an exemplary embodiment, the lamp tube 110 may include a transparent material, such as glass, so as to make light generated in the lamp tube 110 emitted to an outside of the light emitting lamp 100.

A discharge gas for light emission of the light emitting lamp 100 may be injected into the lamp tube 110. In one exemplary embodiment, xenon (Xe) gas, mercury (Hg) gas, neon (Ne) gas, or argon (Ar) gas may be used as the discharge gas. In one exemplary embodiment, and with reference to FIG. 1B, since a first distance between first and second electrodes 120a and 120b of each set electrode 120 is effectively defined by a diameter of the lamp tube 110 taken substantially perpendicular to the extension line L, and since the first distance is shorter than a second distance along the extension line L between set electrodes disposed on both of opposing ends of the lamp tube 110, the light emitting efficiency can be heightened where the xenon gas as the discharge gas.

A fluorescent layer 107, which is disposed onto an inner surface of the lamp tube 110, is excited by ultraviolet rays generated from the discharge gas to emit visible rays. If a voltage is applied to each set electrode 120, plasma discharge occurs in the discharge gas existing inside the lamp tube 110 to emit ultraviolet rays. In one exemplary embodiment, where the xenon gas is used as the discharge gas, xenon atoms are ionized by the discharge, and thus ultraviolet ("UV") rays, e.g. vacuum ultraviolet ("VUV") rays, may be generated. The VUV rays as generated above are converted into visible rays by the fluorescent layer 107, so that the light emitting lamp 100 can provide light.

Referring again to FIG. 1B, the periphery of the lamp tube 110 is divided into a first region I and a second region II by a plane E including the extension line L. Each of the set electrodes 120 includes a first electrode 120a disposed on the first region I, and a second electrode 120b disposed on the second region II.

As illustrated in FIG. 1B, one virtual plane E among a large number of planes including the extension line L may be defined. In one exemplary embodiment, where the lamp tube 110 is cylindrical, the extension line L may penetrate the center of a circle on one cross section of the lamp tube 110, and the plane E including the extension line L may include the diameter of the cross section of the lamp tube 110. However, this is merely exemplary, and the shape of the lamp tube 110 and the positional relation between the lamp tube 110 and the extension line L may be changed in diverse manner.

The plane E including the extension line L may divide the periphery of the lamp tube 110, e.g. an outer surface of the lamp tube 110, into the first region I and the second region II. In the illustrated embodiment, the first electrode 120a and the second electrode 120b of one set electrode 120 may be disposed in the first region I and the second regions II, respectively. The first electrode 120a and the second electrode 120b may be disposed to face each other with respect to the lamp tube 110 as a center as illustrated in FIG. 1B.

As illustrated in the drawing, the first and second electrodes 120a and 120b may be symmetrically disposed around the plane E including the extension line L as a center. In an exemplary embodiment, if it is assumed that the first electrode 120a is positioned at a (first) certain point on the periphery of the lamp tube 110, the second electrode 120b may be positioned at a second point which is disposed symmetrical to the first point where the first electrode 120a is positioned around the extension line L of the lamp tube 110 as a center. Here, the symmetrically disposed second point may include not only the exact point location disposed symmetrical to the first point where the first electrode 120a is positioned around the extension line L as a center, but also may include points disposed directly adjacent to the section point.

Referring to FIGS. 2A and 2B, the set electrode 120 may be disposed to longitudinally extend along an extension direction of the extension line L. As illustrated in the exemplary embodiment, each of the first and second electrodes 120a and 120b of the set electrode 120 may be disposed having a length taken in the extension direction of the lamp tube 110 which is larger than a width taken perpendicular to the extension direction of the extension line L. In one exemplary embodiment, the first and second electrodes 120a and 120b may each have a width of about 1 millimeter (mm), but is not limited thereto.

The first and second electrodes 120a and 120b of the set electrode 120 may include a conductive material. In one exemplary embodiment, the first and second electrodes 120a and 120b may each include a nickel-silver (Ni—Ag) alloy. The first and second electrodes 120a and 120b of the set electrode 120 may be disposed on the outer surface of the lamp tube 110, such as by using a printing method. However, this is merely exemplary, and diverse methods may be used to form the first and second electrodes 120a and 120b on the outer surface of the lamp tube 110.

On the periphery of the lamp tube 110, electrode insulating parts 130 electrically separating adjacent set electrodes 120 from each other, may be further disposed. As illustrated in FIG. 2B, if it is assumed that adjacent set electrodes among a plurality of set electrodes 120 include a first set electrode and a second set electrode disposed directly adjacent to the first set electrode in the longitudinal direction of the light emitting lamp 100, the electrode insulating parts 130 may be disposed on the periphery of the lamp tube 110 to overlap both a lower part of one (e.g., first) end of the first electrode 120a_1 of the first set electrode 120, and a lower part of one (e.g., first) end of the first electrode 120a_2 of the second set electrode. The first ends of the first electrode 120a_1 and the first electrode 120a_2 are disposed directly adjacent to each other along the longitudinal direction of the lamp tube 110.

Each of the electrode insulating parts 130 may also be disposed substantially in the same manner to overlap a first end of the second electrode (not shown) of the first set electrode and a first end of the second electrode (not shown) of the second set electrode. In one exemplary embodiment, the electrode insulating parts 130 may be formed by coating transparent glass on the periphery of the lamp tube 110. Each of the electrode insulating parts 130 is a unitary indivisible and continuous member. Each of the opposing ends of the first and second electrodes, of each of the first set electrode and the second set electrode, are respectively overlapped by a portion of an electrode insulating part 130 in a plan view of the light emitting lamp 100. A lower surface of the ends of the first and second electrodes directly faces an upper surface of the portions of the electrode insulating parts 130, as illustrated in FIGS. 1A and 2B.

Since the electrode insulating parts 130 electrically insulate the adjacent set electrodes from each other, the insulating parts 130 can reduce or effectively prevent an electric short from occurring between the adjacent set electrodes. Further, since the electrode insulating parts 130 electrically separate the adjacent set electrodes from each other, they enables different voltages to be stably applied to the adjacent first and second set electrodes.

The plurality of set electrodes 120 may be arranged along the extension line L of the lamp tube 110, and may be successively disposed on the periphery of the lamp tube 110, such as being disposed directly adjacent to one another in linear series along the extension line L. As illustrated in FIGS. 2A and 2B, the successive disposing of the set electrodes 120 means the successive linear arrangement of the set electrodes 120 along an extension direction of the lamp tube 110. However, the arrangement of the set electrodes 120 is not limited to the arrangement in a line as described above, but may be made in diverse manners. In one exemplary embodiment, the set electrodes 120 may not be arranged in the same straight line as the adjacent set electrodes.

Referring to FIG. 2C, the lamp tube 110 may include a plurality of light emitting regions BR1 to BRm, and the light emitting regions BR1 to BRm may be defined by a plurality of set electrodes 120, respectively. The light emitting regions Br1 to BRm overlap an entire of the set electrodes 120, and include areas directly adjacent to edges of the set electrodes, as indicated by the dotted line boxes in FIG. 2C.

As described above, if a voltage is applied to the first and second electrodes 120a and 120b of the set electrode 120, light is generated in the light emitting region BR1, by the discharge gas and the fluorescent layer in the lamp tube 110. Accordingly, by adjusting the voltage being applied to the first and second electrodes 120a and 120b, the light generated from the lamp tube 110 in the light emitting region BR1, i.e. the luminance of the lamp tube 110, can be adjusted. Thus, the light emitting regions BR1 to BRm may be defined to correspond to the set electrodes 120. As used herein, "correspond" is used to indicate one element is related in positional relationship, dimension and/or shape to another element.

In the illustrated embodiment, the plurality of set electrodes 120 are disposed on the periphery of the lamp tube 110, and different voltages may be applied to at least two set electrodes among the set electrodes 120. Although one set electrode is defined for one light emitting region, two or more set electrodes may also be defined as one light emitting region in accordance with the connection type of wirings.

Through independent adjustment of voltages being applied to the set electrodes 120, at least two light emitting regions among the light emitting regions BR1 to BRm of one lamp tube 110 may have different luminance values. Accordingly, the lamp tube 110 may provide one single and continuous reaction space (See "105" in FIG. 1B) therein, and the light emitting regions BR1 to BRm may be included in the one reaction space 105. That is, the light emitting regions BR1 to BRm may not be physically separated from one another, but may be included in one reaction space 105. Accordingly, local dimming for controlling luminance is not limited to a one-dimensional local dimming, such as in a row or column, and multi-dimensional dimming can be achieved through light emitting lamps 100 which are line light sources.

In the illustrated embodiment, even if the voltages being applied to the set electrodes 120 are independently adjusted, as described above with reference to FIG. 2B, the influence, which the voltages being applied to the respective set electrodes 120 exert upon the adjacent set electrodes 120, can be minimized by the electrode insulating parts 130 disposed between the respective set electrodes 120. The same effect may also appear in a backlight assembly according to exemplary embodiments of the present invention to be described later.

In the light emitting lamp according to an embodiment of the present invention, the set electrodes disposed on the periphery of the lamp tube are independently controlled, and at least two light emitting regions among the light emitting regions included in one light emitting lamp can have different luminance values. That is, one light emitting lamp can include a plurality of light emitting regions having various luminance values. Accordingly, more effective local dimming can be implemented using line light sources, and thus the display quality can be improved.

Hereinafter, with reference to FIGS. 3A to 5, a backlight assembly according to an exemplary embodiment of the present invention will be described.

Figure 3A:
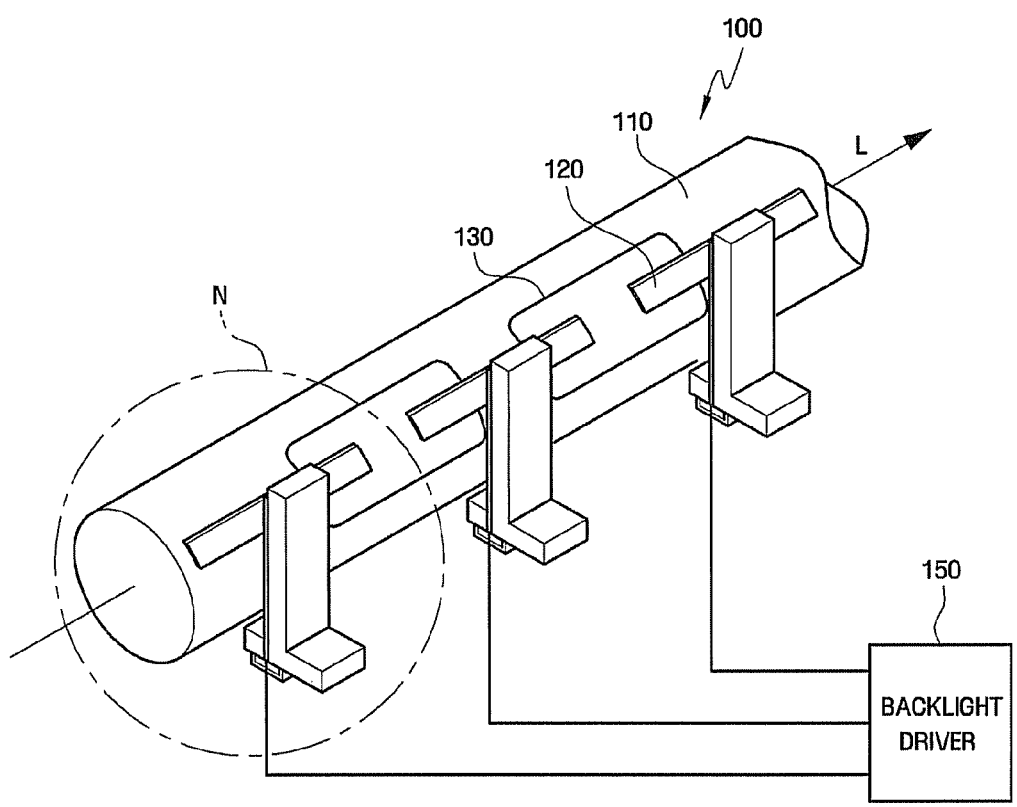
FIG. 3A is a partial perspective view illustrating an assembled structure of a light emitting lamp included in a backlight assembly according to an exemplary embodiment of the present invention.
Figure 3B:
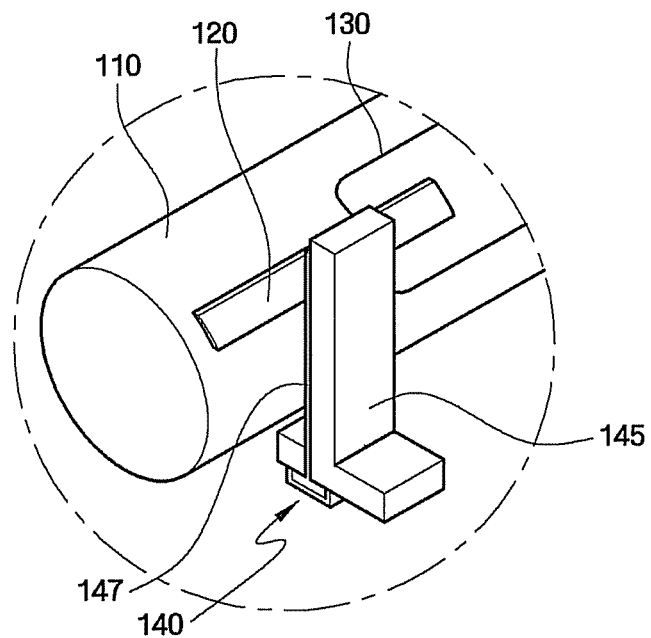
FIG. 3B is a partial enlarged view of portion "N" in FIG. 3A.
Figure 4A:
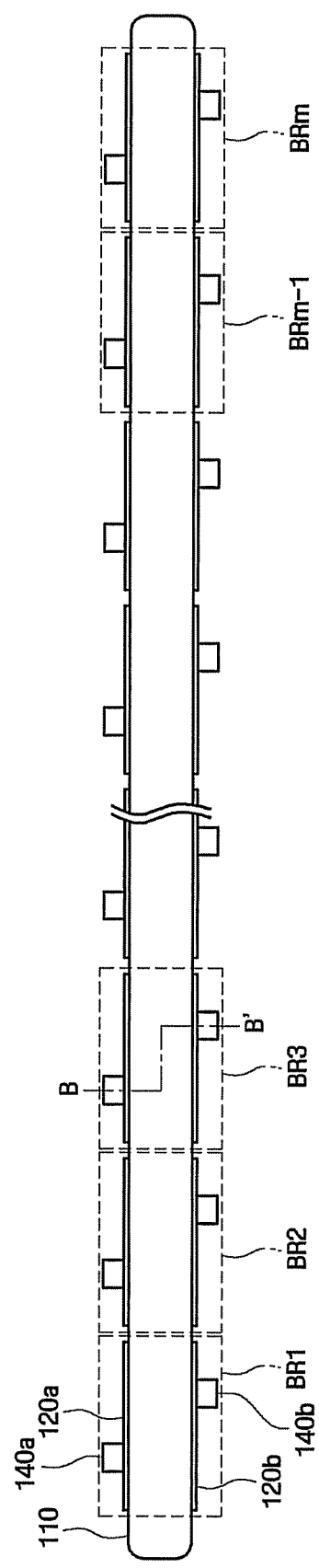
FIGS. 4A and 4B are a plan and enlarged view of the assembled structure of the light emitting lamp of FIG. 3A, respectively.
Figure 4B:
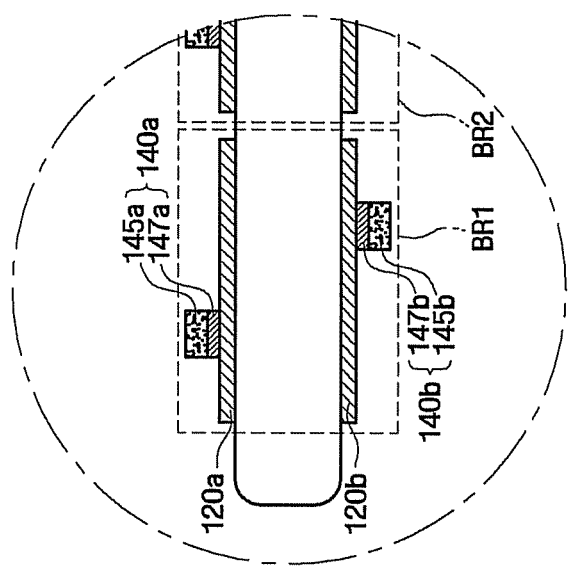
Figure 4C:
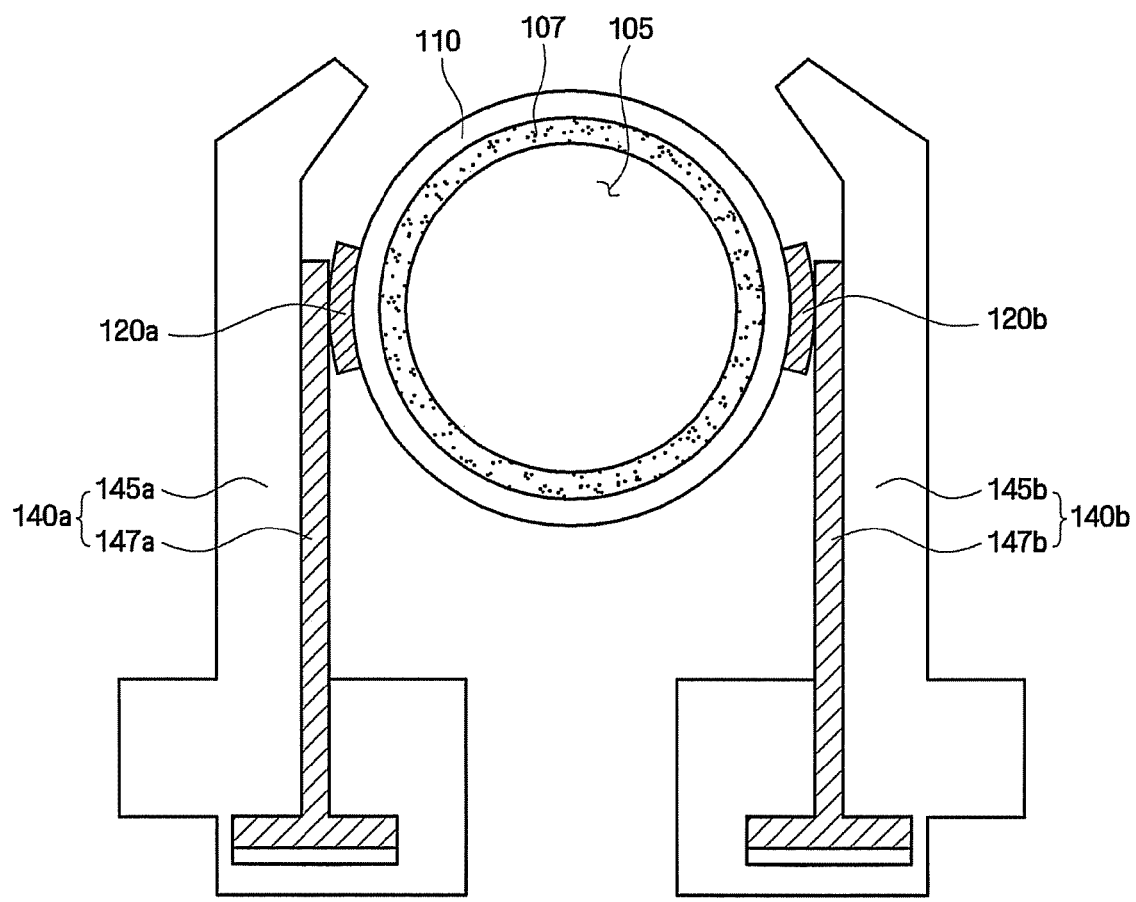
FIG. 4C is a sectional view of the assembled structure of the light emitting lamp, taken along line B-B' of FIG. 4A.

FIG. 3A is a partial perspective view illustrating an assembled structure of a light emitting lamp included in a backlight assembly according to an exemplary embodiment of the present invention, and FIG. 3B is a partial enlarged view of portion "N" in FIG. 3A. FIGS. 4A and 4B are a plan and enlarged view seen from the upper part of the assembled structure of the light emitting lamp of FIG. 3A, and FIG. 4C is a sectional view of the assembled structure of the light emitting lamp, taken along line B-B' of FIG. 4A. FIG. 5 is a conceptual view illustrating a backlight assembly according to an embodiment of the present invention.

The backlight assembly according to an exemplary embodiment of the present invention includes a plurality of a light emitting lamp. Accordingly, for convenience in explanation, the description of substantially the same constitutional elements as those of the light emitting lamp according to the exemplary embodiments of the present invention as described above will be omitted or simplified.

Referring to FIGS. 3A to 4C, the backlight assembly according to an exemplary embodiment of the present invention includes a plurality of a light emitting lamp 100, each of which includes a lamp tube 110 longitudinally extended along an extension line L defined within the lamp tube 110 and a plurality of set electrodes 120 disposed on a periphery (e.g., outer surface) of the lamp tube 110, and a backlight driver 150 controlling luminance of light provided by the light emitting lamps 100.

As illustrated in FIG. 3A, the light emitting lamp 100 includes the lamp tube 110, and the set electrodes 120 disposed on the periphery of the lamp tube 110. The light emitting lamp 100 includes a plurality of light emitting regions (See "BR1 to BRm" in FIG. 2C), which overlap with and correspond to the set electrodes 120 arranged along the extension line L. The lamp tube 110 of the light emitting lamp 100 provides one single and continuous reaction space therein, and the light emitting regions BR1 to BRm are included in the reaction space 105, so that each of the light emitting lamps 100 can be implemented to include at least two light emitting regions having different luminance values.

The backlight driver 150 controls the luminance of light provided by the light emitting lamp 100. As illustrated in FIG. 3A, the backlight driver 150 applies a driving voltage to the set electrode 120 in accordance with the luminance corresponding to the set electrode 120.

In the illustrated exemplary embodiment, the backlight driver 150 receives optical data signals corresponding to the luminance of the light emitting regions BR1 to BRm, converts the received optical data signals into corresponding voltages, and applies the driving voltages to the set electrodes 120, respectively. A single backlight driver 150 may control each of the set electrodes 120 of the light emitting lamp 110. Although it is exemplified in FIG. 3A that the driving voltages are applied to each of the set electrodes 120, individually, it is also possible to electrically connect two or more set electrodes 120 together, and to control the two or more set electrodes 120 electrically connected as a single unit, so that the connected set electrodes 120 have the same luminance. The relation between the light emitting regions BR1 to BRm and the backlight driver 150 will be described later with reference to FIG. 5.

The backlight assembly according to the exemplary embodiment of the present invention may include a plurality of a set socket 140 to which the light emitting lamps 100 are fixed. As illustrated in FIGS. 3A and 3B, each of the set socket 140 may include a conductive terminal 147 which is in contact with the light emitting lamp 100 to support the light emitting lamp 100, and applies the driving voltage to the set electrode 120. The conductive terminal 147 is disposed between the light emitting lamp 100 and a support part 145 which supports the light emitting lamp 100, such as in a fixed position. For convenience in explanation, only a first electrode (or a second electrode) disposed on a first region (or a second regions) defined by a plane (not illustrated) including the extension line L, and a first socket (or a second socket) are respectively illustrated in the drawing, it should be noted that the second electrode (or the first electrode) conversely disposed on the second region (or the first region) and the second socket (or the first socket) have been omitted.

With reference to FIGS. 4A, 4B and 4C, the set sockets 140 will be described in more detail. The set socket 140 may include a first socket 140a electrically connected to the first electrode 120a, and a second socket 140b electrically connected to the second electrode 120b of a one set electrode 120.

More specifically, the first socket 140a may include a first support part 145a supporting the light emitting lamp 100 and a first conductive terminal 147a contacting the first electrode 120a of the set electrode 120. In the same manner, the second socket 140b may include a second support part 145b supporting the light emitting lamp 100 and a second conductive terminal 147b contacting the second electrode 120b of the set electrode 120. As described above, the first and second electrodes 120a and 120b of the one set electrode 120 may receive the driving voltages corresponding to the set electrodes 120 through the first and second conductive terminals 147a and 147b. That is, the first and second electrodes 120a and 120b of each of the one of the set electrodes may independently control the voltages being applied to the set electrodes 120 through the set sockets 140 corresponding to the set electrodes 120, respectively.

As illustrated in FIG. 4A, the first socket 140a and the second socket 140b may be arranged to cross each other around the light emitting lamp 100 as a center. In the plan view of the light emitting lamp 100, the first and second sockets 140a and 140b are alternately arranged or staggered in position along the longitudinal direction of the emitting lamp 100. The first and second sockets 140a and 140b do not face each other with respect to the lamp tube 110, while the first and second electrodes 120a and 120b, upon which the first and second sockets 140a and 140b are disposed, do face each other with respect to the lamp tube 110.

In the illustrated exemplary embodiment, if it is assumed that a first virtual straight line, which penetrates the light emitting lamp 100 at a point where the first socket 140a is arranged on the extension line L of the light emitting lamp 100, is defined perpendicular to the extension line L, the second socket 140b is not arranged in the first virtual straight line. In other words, a distance between the first socket 140a and an adjacent one of the second socket 140b in the longitudinal direction may be greater than a maximum dimension of the lamp tube 110 on the cross section obtained by cutting the light emitting lamp 100 at right angles to the extension line L. For example, where the lamp tube 110 is cylindrical, the distance between the first socket 140a and the second socket 140b may be greater than the diameter of the lamp tube 110.

The alternating or staggering of the locations of the first and second sockets 140a and 140b reduces or effectively prevents the occurrence of discharge between the first conductive terminal 147a and the second conductive terminal 147b. Accordingly, the first socket 140a and the second socket 140b may be arranged at a distance sufficient enough to prevent the undesirable discharge occurrence between the first conductive terminal 147a and the second conductive terminal 147b.

In an exemplary embodiment, the first and second support parts 145a and 145b may include a resin having a heat resistance and/or a UV resistance. Also, the first and second support parts 145a and 145b may be fixed to a lower receptacle of a display device to be described later. Further, as illustrated in FIG. 4C, ends of the first and second support parts 145a and 145b on the side of the light emitting lamp 100 may be formed to be bent in the direction of the light emitting lamp 100 so that the light emitting lamp 100 does not secede from the first and second sockets 140a and 140b.

Each of the first and second support parts 145a and 145b include a substantially vertical first portion disposed between upper and lower ends of the first and second support parts 145a and 145b. An upper (distal) end of each of the first and second support parts 145a and 145b are inclined from the vertical first portion towards the light emitting lamp 100, and inclined towards each other. In an exemplary embodiment, a distance between the upper distal ends of the first and second support parts 145a and 145b may be less than a distance between outer surfaces of the first and second electrodes 120a and 120b.

A lower (distal) end of each of the first and second support parts 145a and 145b are inclined from the vertical first portion towards the light emitting lamp 100, and inclined towards each other. The lower distal ends may be inclined about 90 degrees with respect to the vertical first portion. The inclined portion of the lower distal ends may define a base of the first and second sockets 140a and 140b, respectively.

In the illustrated embodiment, the first and second sockets 140a and 140b may also each include a second portion extended substantially perpendicular to the vertical first portion, in a direction opposite to the extension of the lower distal ends, and towards an external area of the first and second sockets 140a and 140b. A lower surface of the second portions are disposed separated from a lowermost surface (e.g., at the base) of the first and second sockets 140a and 140b. The first portion, the second portion and the inclined ends of each of the first and second sockets 140a and 140b, respectively form a unitary indivisible socket member.

The first and second conductive terminals 147a and 147b may include a conductive material, so as to apply the voltages from the backlight driver 150 to the first and second electrodes 120a and 120b, respectively. Also, a first end of the conductive terminal 147 may be electrically connected to the backlight driver 150, so as to receive the voltage corresponding to the set electrode 120 from the backlight driver 150, and a second end, opposing the first end, of the conductive terminal 147 may be electrically connected to the first or second electrode 120a or 120b, respectively, so as to apply the voltage provided from the backlight driver 150 to the set electrode 120.

As illustrated in FIG. 5, portions of the respective light emitting lamps 100 may be divided into a plurality of light emitting blocks BL1 to BL(n×m), and at least two light emitting blocks among the light emitting blocks BL1 to BL(n×m) may have different luminance values. Each light emitting block BL1 to BL(n×m) may include a portion of one or more of the light emitting lamps 100. The portion of each light emitting lamp 100 may include one or more of a set electrode 120. While FIG. 5 shows each light emitting block BL1 to BL(n×m) includes portions of a group of three light emitting lamps 100, the portions each including one set electrode 120, the present invention is not limited thereto. Alternatively, a light emitting block BL1 to BL(n×m) may include portions of more or less than three light emitting lamps 100 and/or the portion may include more than one set electrode 120 of a single light emitting lamp 100. Additionally, each of the light emitting block BL1 to BL(n×m) may not include the same number and/or arrangement of light emitting lamps 100 and/or portions of a light emitting lamp 100.

Referring to FIGS. 1A, 2B, 3A and 3B, the electrode insulating parts 130 are disposed overlapping an area between adjacent set electrodes 120. As illustrated in FIG. 5, a boundary area between the first light emitting block BL1 and the second light emitting block BL2 is disposed at the area between adjacent set electrodes 120. The dotted line boxes in FIG. 5, indicating the boundary area between adjacent light emitting blocks BL, overlaps the area between adjacent set electrodes 120. Accordingly, the electrode insulating parts 130 are disposed in the boundary area between adjacent light emitting blocks BL.

Also, the light emitting block BL1 to BL(n×m) may include at least two light emitting regions BR1 to BRm (See FIG. 4A) defined in at least each of two light emitting lamps 100. Where there are at least two light emitting regions defined in at least two light emitting lamps 100, the at least two light emitting regions included in a same light emitting block may be adjusted to have the same luminance.

More specifically, as the backlight driver (See "150" in FIG. 3A) controls the voltages being applied to the set electrodes 120 through the set sockets 140, the luminance of light being provided from the light emitting lamps 100 can be controlled by light emitting blocks BL1 to BL(n×m). In this case, the light emitting block BL1 to BL(n×m), e.g. the first light emitting block BL1, may have the same luminance as that of light emitting regions of three adjacent light emitting lamps 100 defining the first light emitting block BL1. Accordingly, by grouping two or more light emitting regions existing in at least two light emitting lamps 100 into one light emitting block BLm, multi-dimensional, such as two-dimensional ("2D"), local dimming can be implemented through light emitting lamps 100 which are line light sources. As illustrated in FIG. 5, the light emitting blocks BL1 to BL(n×m) arranged substantially in the form of a matrix can be defined, but the present invention is not limited thereto.

As illustrated in FIG. 5, in exemplary embodiments of the present invention, the backlight assembly 200 may include a plurality of backlight drivers 150_1 to 150_m. The respective backlight drivers 150_1 to 150_m may control the luminance of one or more light emitting blocks among the light emitting blocks BL1 to BLm. In one exemplary embodiment, the first backlight driver 150_1 may control the luminance of the first, (m+1)-th, (2m+1)-th, ..., and (2(m−1)+1)-th light emitting blocks BL1, BL(m+1), BL(2m+1), ..., and BL(n(m−1)+1). In the illustrated embodiment, the respective backlight drivers 150_1 to 150_m may control the luminance values of at least two light emitting blocks among the light emitting blocks BL1 to BLm, so that the luminance values of the at least two light emitting blocks differ from each other.

In addition to the exemplary embodiments of the present invention as described above with reference to the drawings, the light emitting block BL1 to BLm may alternatively be connected to one single backlight driver. In one exemplary embodiment, one individual backlight driver may be connected to each of the light emitting blocks BL1 to BLm to independently control the luminance of the respective light emitting blocks BL1 to BLm. Where the one individual backlight driver is connected to each of the light emitting blocks BL1 to BLm, as described above, by the electrode insulating parts (See "130" in FIG. 3A) disposed in a boundary part between the respective light emitting blocks, e.g. in the boundary area between the first light emitting block BL1 and the second light emitting block BL2, the luminance of the first and second light emitting blocks BL1 and BL2 can be independently controlled by the one individual backlight driver.

Hereinafter, with reference to FIGS. 6 and 7, a display device according to an embodiment of the present invention will be described.

Figure 6:
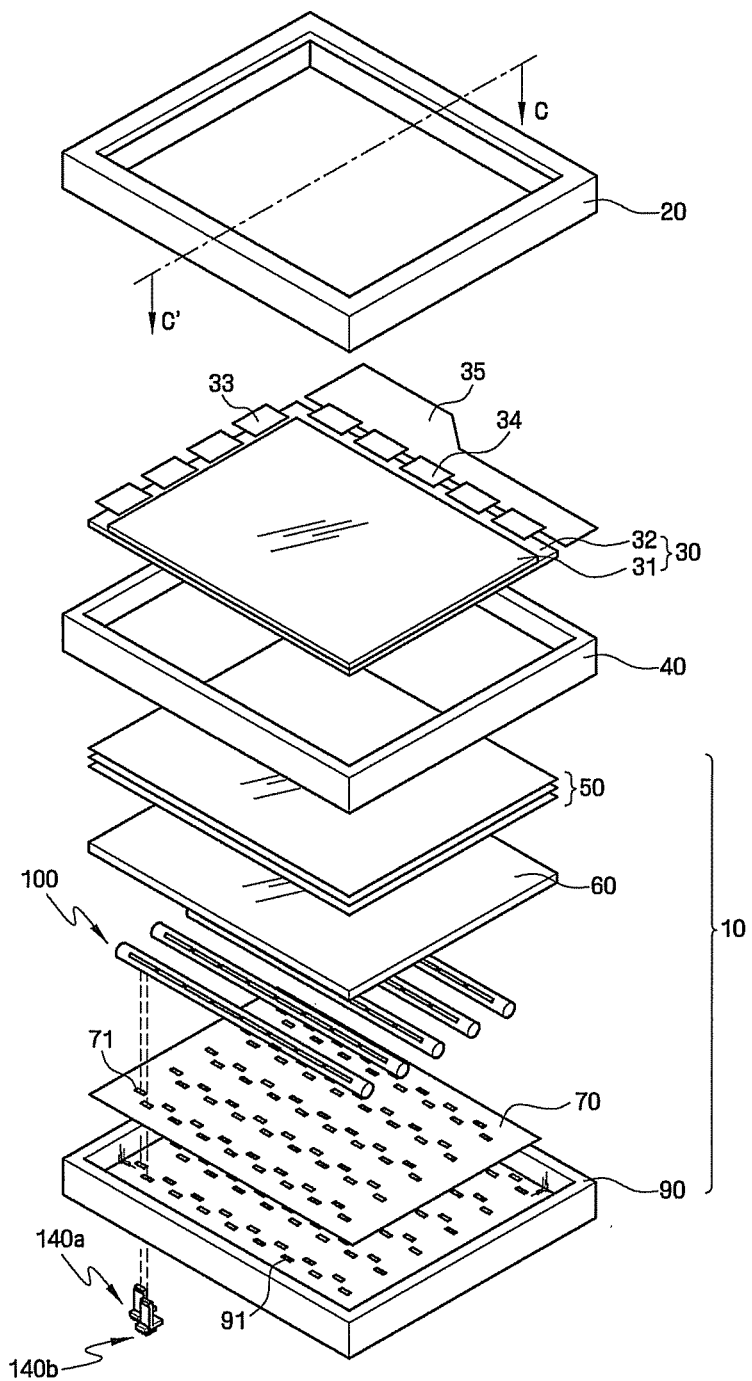
FIG. 6 is an exploded perspective view illustrating a display device according to an exemplary embodiment of the present invention.
Figure 7:
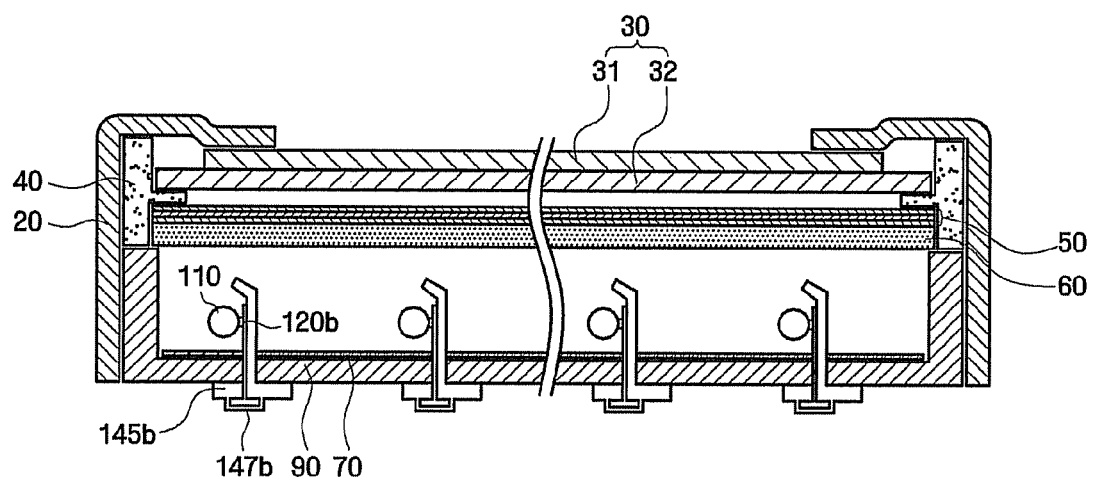
FIG. 7 is a sectional view of the display device, taken along line C-C' of FIG. 6.

FIG. 6 is an exploded perspective view illustrating a display device according to an exemplary embodiment of the present invention, and FIG. 7 is a sectional view of the display device, taken along line C-C' of FIG. 6.

The display device according to an exemplary embodiment of the present invention includes a display panel assembly, an upper receptacle 20, and a backlight assembly 10.

The display panel assembly includes a display panel 30 including a lower substrate 32, an upper substrate 31 and a liquid crystal layer (not illustrated) interposed between the two substrates, a gate driving integrated circuit ("IC") 33, a data driving IC 34, and an integrated printed circuit board 35.

The display panel 30 includes the lower substrate 32 including gate lines (not illustrated), data lines (not illustrated), a thin film transistor array, pixel electrodes, and the like, and the upper substrate 31 includes black matrices, common electrodes, and the like, is disposed to face the lower substrate 32. The display panel 30 as described above serves to display image information.

The upper receptacle 20 may form an external appearance or outermost member of the display device, and a receiving space for accommodating the display panel assembly may be defined therein. In a center portion of the upper receptacle 20, an open window for exposing the display panel 30 to an outside of the display device, may be disposed. The upper receptacle 20 may be coupled to the lower receptacle 90. Between the upper receptacle 20 and the lower receptacle 30, an intermediate frame 40, which accommodates optical sheets 50, a diffusion plate 60 and light emitting lamps 100, and is disposed on the lower receptacle 90, may be included.

The backlight assembly 10 is positioned on a lower part of the display panel 30 to provide light to the display panel 30, such as being disposed facing and overlapping a lower surface of the display panel 30. As used herein, upper may refer to a viewing side of the display device (e.g., towards the upper receptacle 20, while lower may refer to a rear side of the display device (e.g., towards the lower receptacle 90). The backlight assembly 10 includes a plurality of the light emitting lamps 100, the first and second set sockets 140a and 140b, the optical sheets 50, the diffusion sheet 60, the reflection sheet 70, and the lower receptacle 90.

The light emitting lamps 100 may be connected in parallel, being spaced apart from each other in a plan view of the display device, and may be of a direct type. On the periphery of the light emitting lamp 100, a plurality of set electrodes may be disposed. Also, in order to obtain uniform luminance, the light emitting lamps 100 may be longitudinally disposed in parallel to the long side of the lower receptacle 90, while being disposed in parallel to a short (e.g., transverse) side of the lower receptacle 90. Since the light emitting lamps 100 have previously been described in detail, the detailed description thereof will be omitted.

The optical sheets 50 may be disposed on an upper part of the diffusion plate 60, and serve to diffuse and condense the light being transferred from the light emitting lamps 100. The optical sheets 50 may include a first prism sheet, a second prism sheet, and the like. The reflection sheet 70 may include or be made of a material having high reflexibility in order to minimize a loss of light emitted from the light emitting lamps 100.

The light emitting lamp 100 may be supported by the set socket 140 including the first and second sockets 140a and 140b. To fix the first and second sockets 140a and 140b to the lower receptacle 90, the first and second support parts 145a and 145b (See FIGS. 4A and 4B) may be fixed to the lower receptacle 90. In the illustrated embodiment, the lower receptacle 90 and the reflection sheet 70 may include fastening grooves 91 and 71, respectively, which the set sockets 140a and 140b are inserted into and penetrate. The fastening grooves 91 and 71 may be aligned with each other so that portions of the set sockets 140a and 140b can be inserted therein, as shown in the dotted lines of FIG. 6. The first and second sockets 140a and 140b may be fixed to the light emitting lamp 100 as being extending through both the fastening grooves 91 and 71 of the lower receptacle 90 and the reflection sheet 70, respectively, to protrude from an upper surface of the reflection sheet 70 towards the light emitting lamps 100.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A light emitting lamp comprising:
 a lamp tube longitudinally extended parallel to an extension line defined within the lamp tube; and
 a plurality of set electrodes disposed on a periphery of the lamp tube and arranged along the extension line, and comprising a first set electrode and a second set electrode directly adjacent to each other;
 further comprising a plurality of electrode insulating parts disposed between the periphery of the lamp tube and the set electrodes;
 wherein
 the periphery of the lamp tube is divided into a first region and a second region by a plane including the extension line, each of the set electrodes includes a first electrode disposed on the first region and a second electrode disposed on the second region, and an electrode insulating part among the plurality of electrode insulating parts overlaps both the first electrode of the first set electrode and first electrode of the second set electrode, and electrically separates the first and second set electrodes from each other, wherein the electrode insulating part extends between the first electrode of the first set electrode and the first electrode of the second set electrode.

2. The light emitting lamp of claim 1, wherein the lamp tube comprises a plurality of light emitting regions, and each of the light emitting regions is defined by a portion of the plurality of set electrodes arranged along the extension line, respectively.

3. The light emitting lamp of claim 2, wherein
the electrode insulating part among the plurality of electrode insulating parts overlaps both a lower surface of a first end of the first electrode of the first set electrode, and a lower surface of a first end of the first electrode of the second set electrode, the first ends of the first electrodes being directly adjacent to each other along the extension line.

4. The light emitting lamp of claim 2, wherein one continuous reaction space is defined in the lamp tube, and the light emitting regions are included in the reaction space.

5. The light emitting lamp of claim 1, wherein the lamp tube includes discharge gas disposed therein, and the discharge gas comprises xenon (Xe) gas.

6. The light emitting lamp of claim 1, wherein the set electrodes comprise a nickel-silver (Ni—Ag) alloy.

7. The light emitting lamp of claim 1, further comprising a light converting layer on an inner surface of the lamp tube and defining a reaction space in the lamp tube.

8. A backlight assembly comprising:
a plurality of light emitting lamps, each of which includes:
a lamp tube longitudinally extended parallel to an extension line defined within the lamp tube, and
a plurality of set electrodes disposed on an outer surface of the lamp tube and arranged along the extension line, and comprising a first set electrode and a second set electrode directly adjacent to each other,
further comprising a plurality of electrode insulating parts disposed between the outer surface of the lamp tube and the set electrodes,
wherein
the outer surface of the lamp tube is divided into a first region and a second region by a plane including the extension line,
each of the set electrodes includes a first electrode disposed in the first region and a second electrode disposed in the second region, and
an electrode insulating part among the plurality of electrode insulating parts overlaps both the first electrode of the first set electrode and first electrode of the second set electrode, and electrically separates the first and second set electrodes from each other and
a backlight driver controlling luminance of light being provided by the light emitting lamps,
wherein the electrode insulating part extends between the first electrode of the first set electrode and the first electrode of the second set electrode.

9. The backlight assembly of claim 8, wherein the lamp tube comprises a plurality of light emitting regions, and each of the light emitting regions is defined by a portion of the plurality of set electrodes arranged along the extension line, respectively.

10. The backlight assembly of claim 9, wherein one continuous reaction space is defined in the lamp tube, and the light emitting regions are included in the reaction space.

11. The backlight assembly of claim 9, further comprising a plurality of set sockets to which the light emitting lamps are fixed, respectively;
wherein each of the set sockets comprises a first socket electrically connected to the first electrode of the set electrode, and a second socket electrically connected to the second electrode.

12. The backlight assembly of claim 11, wherein the first socket and the second socket are alternately arranged with each other along the extension line with respect to the light emitting lamp as a center.

13. The backlight assembly of claim 11, wherein
the first socket comprises a first support part supporting the light emitting lamp and a first conductive terminal contacting the first electrode of the set electrode, and
the second socket comprises a second support part supporting the light emitting lamp and a second conductive terminal contacting the second electrode of the set electrode.

14. The backlight assembly of claim 9, wherein the backlight driver applies driving voltages to the set electrodes in accordance with luminance values corresponding to the light emitting regions, respectively.

15. The backlight assembly of claim 8, wherein the light emitting lamps are divided into a plurality of light emitting blocks, and each of the light emitting blocks comprises at least two light emitting regions defined in at least two light emitting lamps; and
wherein the backlight driver controls the at least two light emitting regions included in a same light emitting block so that the at least two light emitting regions have the same luminance.

16. The backlight assembly of claim 15, further comprising a plurality of the backlight driver, and the light emitting blocks are connected to the backlight drivers, respectively.

17. The backlight assembly of claim 16, wherein
the light emitting blocks include a first light emitting block and a second light emitting block adjacent to each other, and
the electrode insulating part among the plurality of electrode insulating parts overlaps both a lower surface of a first end of the first electrode of the first set electrode and a lower surface of a first end of the first electrode of the second set electrode, the first ends of the first electrodes being directly adjacent to each other in the direction of the extension line.

18. The backlight assembly of claim 8, further comprising a light converting layer on an inner surface of the lamp tube and defining a reaction space in the lamp tube.

19. A display device comprising:
a liquid crystal panel displaying images;
a backlight assembly disposed below the liquid crystal panel and comprising:
a plurality of light emitting lamps generating and providing light to the liquid crystal panel, each light emitting lamp including:
a lamp tube longitudinally extended in a first direction parallel an extension line defined within the lamp tube, and
a plurality of set electrodes disposed on an outer surface of the lamp tube and arranged along the extension line, and comprising a first set electrode and a second set electrode directly adjacent to each other, further comprising a plurality of electrode insulating parts disposed between the outer surface of the lamp tube and the set electrodes, wherein the periphery of the lamp tube is divided into a first region and a second region by a plane including the extension line, each of the set electrodes includes a first electrode disposed in the first region and a second electrode disposed in the second region; and an electrode insulating part among the plurality of electrode insulating parts overlaps both the first electrode of the first set electrode and first electrode of the second set electrode, and electrically separates the first and second set electrodes from each other, and a backlight driver controlling luminance of light being provided by the light emitting lamps, wherein the electrode insulating part extends between the first electrode of the first set electrode and the first electrode of the second set electrode.

20. The display device of claim 19, wherein the light emitting lamps are divided into a plurality of light emitting blocks, and each of the light emitting blocks comprises at least two light emitting regions defined in at least two light emitting lamps; and wherein the backlight driver controls the at least two light emitting regions included in a same light emitting block so that the at least two light emitting regions have the same luminance.

21. The display device of claim 19, wherein the lamp tube includes a plurality of light emitting regions, and each of the light emitting regions is defined by a portion of the plurality of set electrodes arranged along the extension line, respectively.

22. The display device of claim 21, further comprising a plurality of set sockets to which the light emitting lamps are fixed, respectively;

wherein each of the set sockets comprises a first socket electrically connected to the first electrode of the set electrode, and a second socket electrically connected to the second electrode.

23. The display device of claim 22, wherein the first socket and the second socket are alternately arranged along the first direction with respect to the light emitting lamp as a center.

24. The display device of claim 22, further comprising a lower receptacle accommodating the backlight assembly therein;

wherein a portion of each of the set sockets is disposed to penetrate the lower receptacle and fix the light emitting lamps to the lower receptacle.

25. The display device of claim 19, further comprising a light converting layer on an inner surface of the lamp tube and defining a reaction space in the lamp tube.

* * * * *